Figure 1:
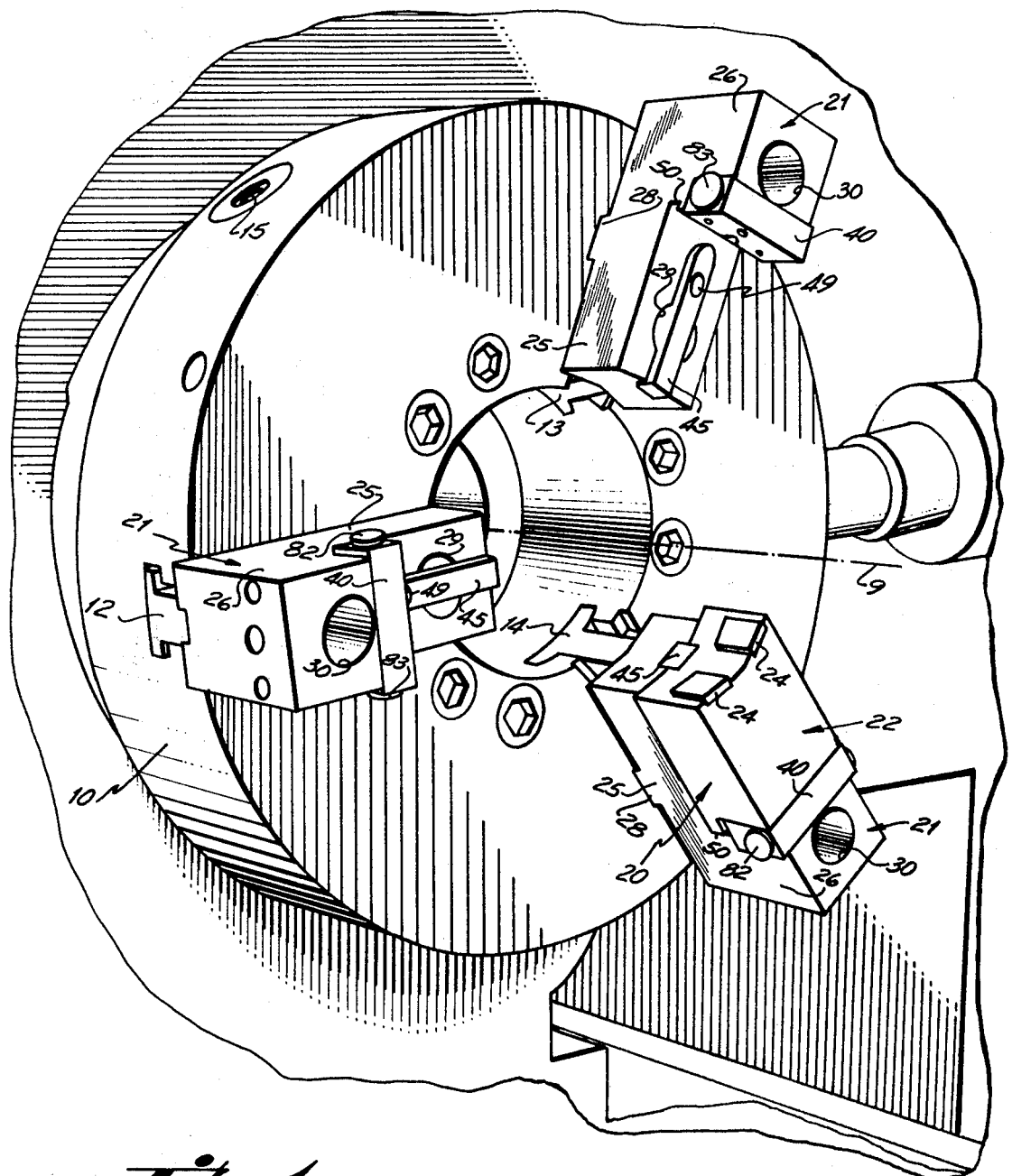

United States Patent

[11] 3,583,717

[72] Inventors Arthur B. Hall;
 William H. Anderson, Cincinnati, both of, Ohio
[21] Appl. No. 804,397
[22] Filed Mar. 5, 1969
[45] Patented June 8, 1971
[73] Assignee The R. K. LeBlond Machine Tool Co.
 Cincinnati, Ohio

[54] CHUCK CONSTRUCTION
 13 Claims, 7 Drawing Figs.
[52] U.S. Cl. .................................................. 279/123
[51] Int. Cl. ....................................... B23b 31/10,
 B23b 31/16
[50] Field of Search.......................................... 279/123, 1

[56] References Cited
 UNITED STATES PATENTS
3,151,862  10/1964  Nicosia........................ 269/273

FOREIGN PATENTS
150,669  6/1921  Great Britain................ 279/123

Primary Examiner—Andrew R. Juhasz
Assistant Examiner—Donald D. Evenson
Attorney—Wood, Herron and Evans ABSTRACT: A snap lock chuck jaw assembly adapted to be mounted upon each of the movable master jaws of a chuck. Each assembly consists of a holder adapted to be bolted to a master jaw and an adapter which is adapted to be snap fit onto the holder. Locating surfaces on the assembly and a spring detent lock cooperate to accurately position each adapter on its respective holder so that the work gripping surfaces of the replaceable adapters run true or concentric with the axis of the chuck upon chuck rotation.

PATENTED JUN 8 1971
3,583,717
SHEET 1 OF 3

INVENTOR.
Arthur B. Hall
William H. Anderson
BY Hood, Gust & Evans
ATTORNEYS

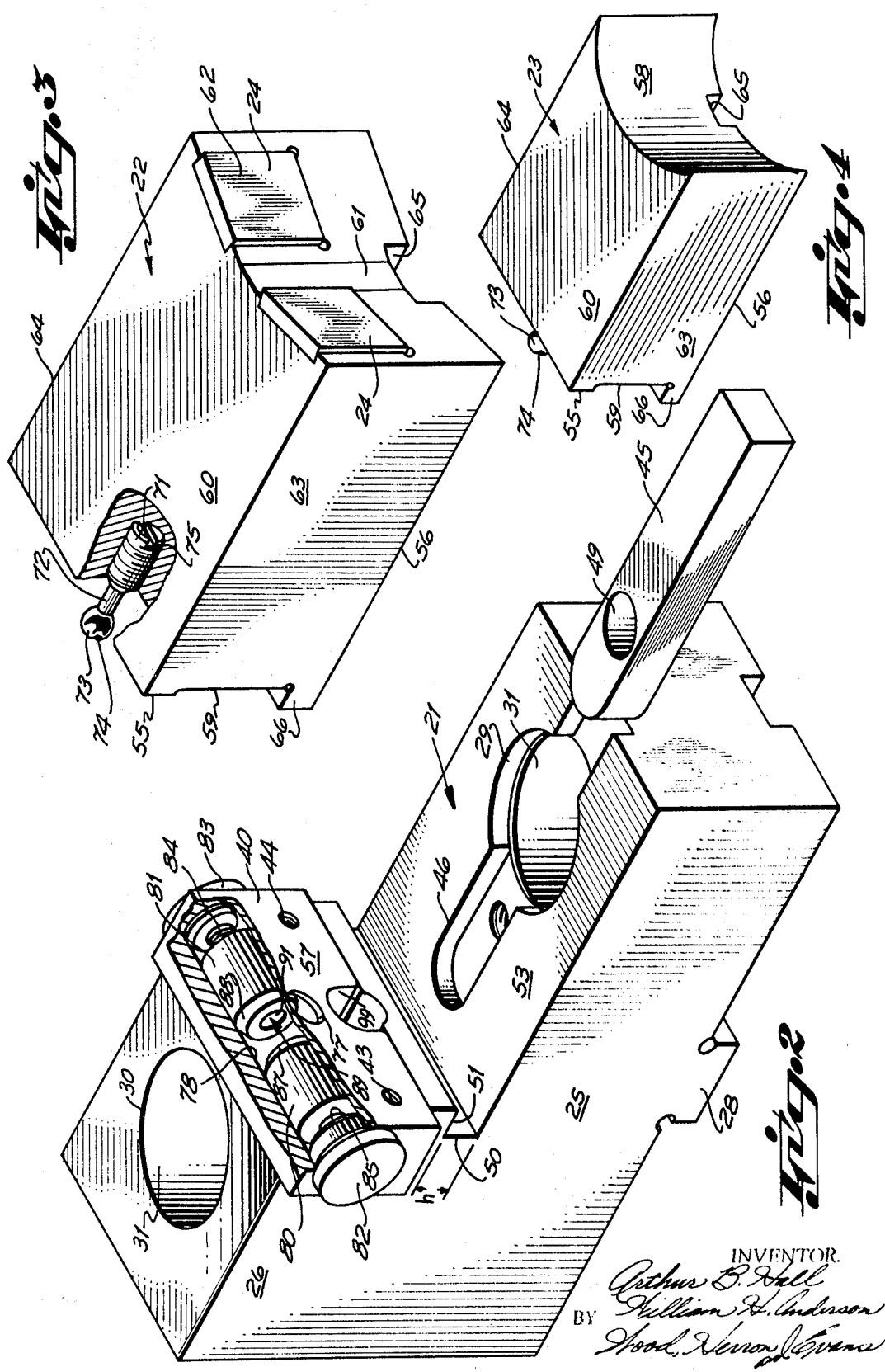

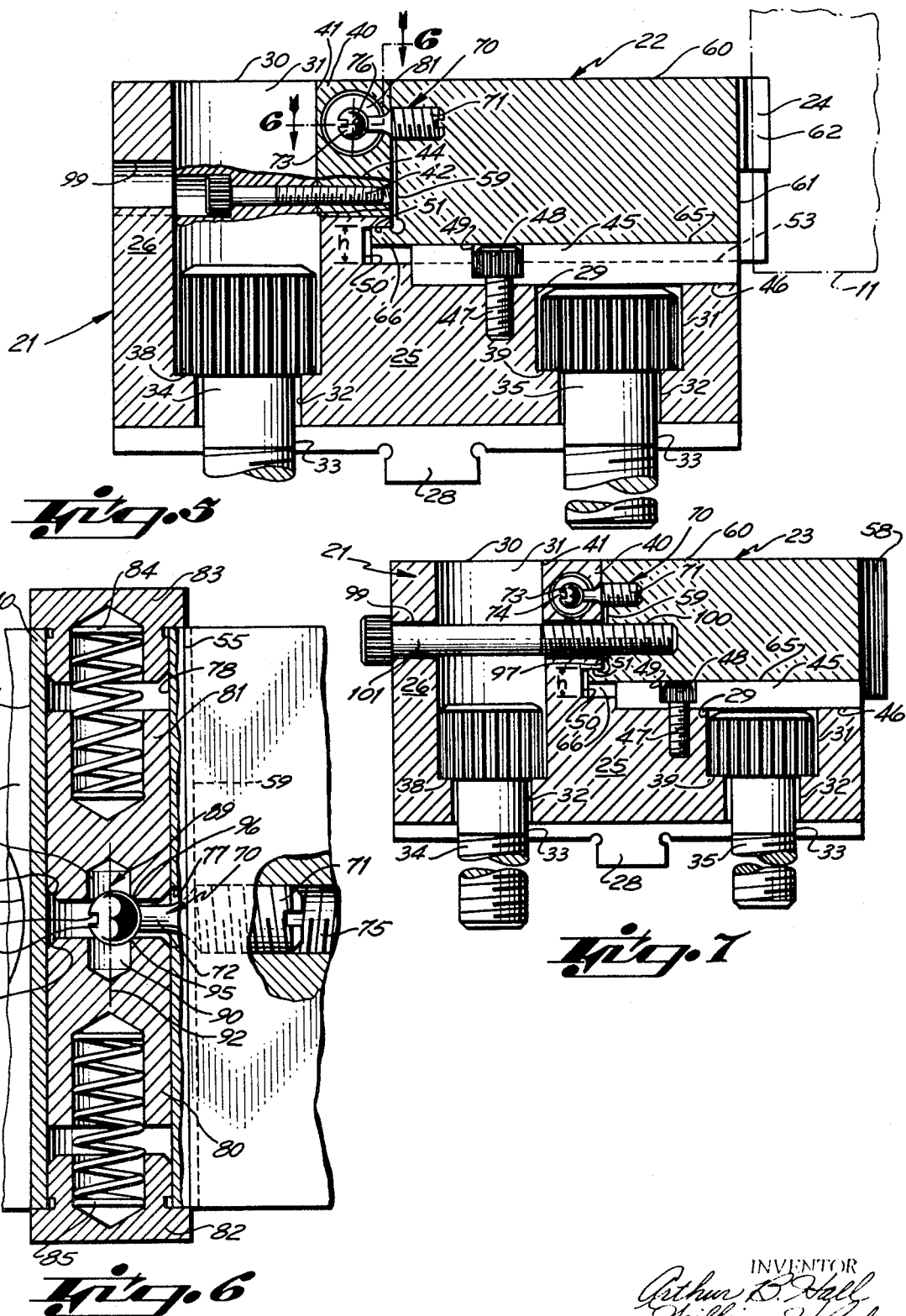

CHUCK CONSTRUCTION

This invention relates to movable jaw chucks and particularly to replaceable jaw assemblies adapted to be mounted upon the movable master jaws of a chuck.

An important item in determining the cost of machined metal parts is the time required to set up the machine tools preparatory to machining. Setup requires a skilled operator whose hourly wage rate is relatively high. To minimize this cost factor, the machine tool industry has, within the last 10 or 15 years, undergone a major revolution which involves the use of automatic programs and programming techniques to control machine setups. Using this technique, the complete machine setup is programmed onto a tape or programming mechanism which then automatically repositions the movable elements of the machine preparatory to each new machining operation. This automatic programming in many instances even involves the tools which are automatically replaced or changed by a programmed tool changer.

One of the few bottlenecks left in setting up a tape controlled or programmed machine tool to convert the machine from one job to another is that of replacing the chucks or alternatively the chucking jaws which support the workpiece for rotation during a machining operation. The chuck jaws must often grip a finished workpiece surface and therefore must be accurately sized to conform to the surface. Additionally, the chuck jaws must run true or be concentric with the axis of the chuck. Conventionally, therefore, each workpiece setup, and even those on tape controlled machines which have automatic tool changers, have required manual replacement of the chuck jaws for each machine setup. After replacement these jaws usually have to be rebored while mounted on the chuck so that the chuck gripping surfaces are concentric with the axis of the chuck. The net effect of this manual remounting and reboring is that a great deal of the machine downtime saved as a result of the preprogramming of the machine is wasted or lost in the time required for chuck jaw replacement.

It has therefore been a primary objective of this invention to provide a chuck construction which eliminates nearly all machine downtime for replacement of the chuck jaws to accommodate new or differently sized workpieces.

Another objective of this invention has been to provide a chuck construction which enables the jaws of the chuck to be replaced and remounted on the chuck with such repeatable accuracy that the chuck jaws need not be rebored in order to relocate the workpiece gripping surfaces on an axis concentric with the chuck axis.

Still another objective of this invention has been to provide replaceable chuck jaws for a chuck which may be accurately repositioned on the chuck without the necessity for the replaceable jaws to be bolted onto the chuck master jaws. Rather, the replaceable portions of the jaws of this invention are easily and quickly snap fit onto the jaw holders.

The snap lock chuck jaw assembly of this invention which accomplishes these objectives consists of a two piece assembly adapted to be mounted upon the movable master jaws of a conventional chuck. It comprises a holder which is adapted to be permanently bolted to each chuck master jaw and a replaceable adapter which is to be snap fit onto the holder.

When viewed in side elevation, the holder is generally L-shaped. It has a vertical leg which is keyed so as to receive a radial groove on the adapter. A horizontal leg of the holder is located at the outer end of the vertical leg and has a detent lock pin receiving hole extending radially inwardly from its inside surface. When the adapter is mounted on the holder, a lock pin on the adapter is inserted into the pin receiving hole of the holder. A ball on the inner end of the lock pin cooperates with a pair of spring biased detents in the holder to lock the adapter onto the holder and to accurately and positively force a locating surface of the adapter into engagement with a hardened locating surface on the holder.

In use, this snap lock chuck jaw assembly enables multiple adapters of either the hard jaw or soft jaw variety to be snap fit onto the holder. Consequently, quick changes may easily be made from a hard jaw adapter for machining a rough casting or forging to a soft jaw adapter for machining a previously finished surface. It also enables quick changes to be made from one soft jaw to another to change the chuck setup for accommodating differently sized or diameter workpieces.

These and other objects and advantages of this invention will be more readily apparent from the following description of the drawings in which:

FIG. 1 is a perspective view of a chuck having the novel chuck jaw assembly of this invention mounted upon each of the movable jaws of the chuck, FIG. 2 is a perspective view, partially broken away, of a holder of a chuck jaw assembly, FIG. 3 is a perspective view, partially broken away of a "hard jaw" adapter, FIG. 4 is a perspective view of a "soft jaw" adapter of the type which may be interchanged with the "hard jaw" adapter of FIG. 3 on the holder of FIG. 2, FIG. 5 is a cross-sectional view of the chuck jaw assembly, FIG. 6 is a cross-sectional view through the holder and adapter taken on Line 6—6 of FIG. 5, and FIG. 7 is a cross-sectional view, similar to the cross-sectional view of FIG. 5, but with a "soft jaw" adapter substituted for the "hard jaw" of FIG. 5.

Referring first to FIG. 1, there is illustrated one embodiment of the type chuck with which this invention is adapted to be used. This chuck rotates about a central axis 9 and is operable to chuck or grip a workpiece 11 for rotation about this same axis 9. To this end, it has three radially movable master jaws 12, 13 and 14, the movement of which is controlled by rotation of a scroll (not shown) located internally of the chuck. This scroll is rotatable by a bevel gear which is turned by means of an Allen head wrench inserted into an eyelet 15. The chuck 10, including the master jaws 12, 13, 14, scroll, and associated gears (not shown) are all conventional in the art, and form no part of this invention. They have therefore not been shown or described in detail herein.

The invention of this application consists of a snap jaw assembly 20 which is adapted to be mounted upon each of the master jaws 12, 13 and 14 of the chuck 10 so as to enable the jaws to be quickly replaced to accommodate different workpieces. This assembly 20 comprises a holder 21 and one or more snap-in inserts 22, 23. For purposes of describing this invention, only two adapters 22, 23 have been shown in the drawings of a preferred embodiment of the invention. These two adapters are generally similar but differ to the extent that one is a "hard jaw" adapter 22 and the other 23 is a "soft jaw" adapter. In the machine tool industry, a hard chuck jaw is one which is used to grip an unfinished surface of a workpiece, such as a forged or cast or rolled workpiece surface. A soft jaw is used to grip a finished surface such as a turned surface of a workpiece. The primary difference in the two is that the hard jaws usually have hardened inserts 24, 24' mounted therein for contacting the workpiece while the soft jaws have a smooth surface contoured to exactly fit against the finished surface of the workpiece. To produce this contoured surface, the soft jaws are generally bored while mounted upon the chuck to specifically fit the diameter of the workpiece to be gripped by the jaws.

Referring now to FIGS. 2 and 5, it will be seen that the holder 21 is generally L-shaped when viewed in side elevation and comprises a radial or base section 25 and an axial section 26 which extends forwardly from the base 25. The base 25 of a holder 21 is adapted to be permanently secured to the outer radial face of a master jaw 12, 13, 14 of the chuck 10 so that the holder moves with the master jaw. To this end, a laterally extending tongue 28 protrudes from the rear of each holder and is adapted to be received in a transverse slot in the master jaw. A pair of parallel bores 29 and 30 extend through the body. Both of these bores comprise a large diameter section 31, an intermediate diameter section 32 and a small diameter section 33. When the holder is mounted upon a master jaw, a pair of bolts 34, 35 seat within these bores 29 and 30 and against shoulders 38, 39 defined between the two sections 31, 32 of the bores 29 and 30.

To accurately locate the adapters on the holder 21, a hardened insert 40 is attached to the holder within a recess 41 machined from the front inside corner of the axial section 26. This insert is bolted to the holder 21 by a pair of bolts 42–42 (FIG. 5) which extend through the axial section 26 and are threaded into threaded apertures 43 and 44 of the insert 40.

A radial key 45 is bolted to the base section 25 of the body 21. This key fits within a radial groove 46 in the front face of the base 25 and is bolted to the body by a screw 47, the head 48 of which is seated within a counterbored section 49 of the key 45. This key 45 functions to transmit lateral or transverse thrust from the adapter 22 or 23 to the body 21 and subsequently to the chuck master jaws.

To prevent adapters from moving axially on the holders, a groove 50 is machined from the axial extension 26 of the body 21 beneath the insert 40. The forwardmost radial surface 51 of this groove prevents the adapter from moving forwardly on the holders as is explained more fully hereinafter. The rear portion or surface of this groove 50 is located in a common plane with the front face 53 of the base section 25 of the body.

Each adapter 22, 23 has a pair of mutually perpendicular locating surfaces 55, 56 adapted to be positioned against two mutually perpendicular faces 53 and 57 of the body. So long as these surfaces 55 and 56 of the adapter are accurately replaceable against the locating surfaces 53 and 57 of the body, the adapters may be repeatedly seated on the body with predetermined positional accuracy. This accuracy is particularly critical in the case of soft jaws because the workpiece clamping surface 58 of the adapters must engage a finished surface of the workpiece over a large area to avoid damage or marring of the machined surface and then must run true or concentric with the axis 9 of the chuck.

Each adapter comprises a front face 60, a rear face 59, an outer face 61, an inner workpiece clamping face 62 and a pair of side faces 63 and 64. Additionally, each adapter has a rectangularly shaped groove or keyway 65 machined from its inner face and adapter to be snugly received over key 45. A ledge 66 extends from the outer rear corner of each adapter and is adapter to be received within the recess or groove 50 of the body. The height $h$ of this ledge is accurately machined so that it corresponds almost exactly to the height $h'$ of the groove 50. Consequently, the ledge 66 and groove 50 cooperate to prevent axial movement and chatter of the adapters on the body.

To facilitate quick removal and replacement of adapters 22, 23 upon the holder 21, each adapter has a locating pin 70 extending outwardly from its outer face. This pin comprises a threaded inner section 71, a thin cylindrical neck 72 and a locating ball 73. The threaded section 71 is adjustably threaded into a threaded bore in the outer face 59 of the adapter. A screwdriver slot 74 in the outer face of the ball enables the pin to be adjusted within the bore 75 so as to accurately position the center 76 of the ball 73 a predetermined distance from the outer locating surface 55 of the adapter. As is explained more fully hereinafter, this distance is critical to the accurate positioning of each adapter on the body.

A radial bore 77 extends radially into the insert 40 from the front face 57 thereof. This bore 77 is adapted to receive the outer end and ball 73 of the pin 70 as is explained more fully hereinafter. Intersecting the radial bore 77 is a transverse bore 78 which extends completely through the insert 40 from one side to the other. A pair of detent pins 80, 81 are slidable within this bore and are maintained therein by a pair of end plugs 82, 83. These plugs may be secured within the bore by any suitable means, as for example by epoxy resin or by being threaded therein.

A pair of compression springs 84, 85 are located within the transverse bore 78 between the ends of the detent pins 80, 81 and the inner ends of the plugs 82, 83, respectively. These springs 84, 85 tend to force the plugs and pins apart and thereby force the chamfered inner ends 87, 88 of the detent pins 80, 81 inwardly toward each other. At the inner end, each detent pin 80, 81 has a cylindrical recess 89 machined therein. This recess 89 extends transversely into the detent pin from the inner end face 88 and is slightly smaller in diameter than the diameter of the ball 73 of the locating pin 70.

As may be seen most clearly in FIG. 6, the distance from the center line 92 of the two recesses 90, 91 to the inner face 57 of the insert 40 is slightly greater than the distance from the center 76 of the ball 73 to the locating surface 55 of the adapter. Consequently an inner corner 95, 96 of the detent pins always engages an inner surface portion of the ball 73 when a locating pin 70 of an adapter is located between the two detent pins 80, 81. Thus, the detent pins 80, 81 always maintain a bias on the adapter tending to pull it outwardly and thereby force the locating surface 55 into intimate engagement with the front face 57 of the insert 40.

The front face 57 of the insert 40 is preferably hardened so that it is subject only to minimal wear and abrasion and always accurately locates the adapters in a radial plane relative to the body.

Referring now to FIG. 7, there is illustrated a "soft" jaw adapter 23 mounted upon the holder 21. Soft jaws are generally mounted upon the chuck before the inner workpiece engaging surface 58 of the adapter is machined so that the finished surface 58 conforms and is concentric to the diameter of a workpiece clamped between the jaws. Only in this way can the workpiece engaging surfaces 58 of the soft jaws be made concentric with the rotational axis of the chuck 10. To enable the soft jaws 58 to be bored while mounted upon the holders 21, each holder 21 has a radial bore 99 which extends through the axial portion 26 of the holder and intersects the centerline of the bore 30. Each soft jaw adapter has a threaded bore 100 extending outwardly from its outer face 97 in coaxial alignment with the bore 99 when the adapter 23 is mounted on the holder 21. When the workpiece engaging surface 58 of the jaw 23 is to be bored while mounted upon the holder 21, a bolt is inserted through the aperture 99 and threaded into the recessed bore 100. This bolt 101 then prevents movement of the adapter 23 upon the holder while the work engaging surface 58 of the adapter is bored. After the surface 58 has been bored, the bolt 101 is never used in conjunction with the adapter unless or until the size workpiece with which the soft jaw is used is to be changed and the jaw rebored.

The primary advantage of the chuck jaw assembly heretofore described is the accuracy and repeatability with which it enables various sizes and types of adapters to be mounted upon the master jaws 12, 13 and 14 of a chuck. For example, hard jaws for supporting rough unmachined surfaces of a workpiece may first be used in the chuck to clamp an unmachined surface of a workpiece. These hard jaws generally have carbide or other hardened inserts 24, 24 mounted in a generally V-shaped work engaging surface of the jaw and engageable with the workpiece 11. After the workpiece 11 has been rough machined, the hard jaw adapters 22 may be pulled radially inwardly so that the ball 73 of the locating pin 70 is pulled from between the two detent pins 80, 81 of the adapter body 21. A new soft jaw 23 having a machined workpiece engaging surface 58 which conforms perfectly to the contour of the machined surface of the workpiece 11 may then be moved radially outwardly over the key 45 until the ledge 66 of the jaw is located within the groove 50 and the ball 68 on the end of the locating pin slips into the aperture 75 and between the two detent pins 80, 81. The pins then engage the ball 73 on an inner surface thereof so that the spring bias of the pins 80, 81 tends to pull the soft jaw 23 outwardly away from the center of the chuck and thereby accurately position the locating surface 55 of the adapter against the locating surface 57 of the body 21.

While we have described only a single preferred embodiment of our invention, those persons skilled in the arts to which this invention pertains will readily appreciate numerous changes and modifications which may be made without departing from the spirit of our invention. Therefore, we do not intend to be limited except by the scope of the appended claims.

Having described our invention, we claim:

1. For use in combination with a chuck having a plurality of movable jaws, a chuck jaw assembly adapted to be mounted upon a jaw of the chuck, said assembly comprising a holder and an adapter, said holder having a seat thereon for receiving said adapter, said seat being at least partially defined by a pair of mutually perpendicular locating surfaces, one of said surfaces being parallel to the axis of said chuck and the other surface being located in a radial plane of said chuck when said holder is mounted upon said chuck, said adapter having a pair of mutually perpendicular surfaces, one of said surfaces being parallel to the axis of said chuck when said adapter is mounted upon said chuck and the other surface being located in a radial plane of said chuck when said adapter is mounted upon said chuck, said mutually perpendicular surfaces of said adapter being cooperable with the mutually perpendicular surfaces of said holder to locate said adapter on said seat of said holder, cooperating snap-fit means on said holder and said adapter for replaceably securing said adapter on said holder, and biasing means for maintaining a resilient bias of that one of said locating surfaces of said adapter which is parallel the axis against said one surface of said holder which is parallel said axis when said adapter is mounted upon said holder.

2. The chuck jaw assembly of claim 1 which further includes means for fixedly securing said holder upon a movable jaw of a chuck.

3. The chuck jaw assembly of claim 1 which further includes a ledge on one of said adapter or holder and a cooperating recess on the other of said adapter and holder, said ledge and recess being located in a plane perpendicular to the axis of said chuck when said assembly is mounted upon said chuck and having closely fitting cooperating radial surfaces which prevent said adapter from moving axially on said holder.

4. The chuck jaw assembly of claim 1 which further includes a key on one of said adapter or holder and a cooperating keyway on the other of said adapter or holder, said key and keyway being located in a radial plane of a chuck when said assembly is mounted upon said chuck so that said adapter can only be secured to said holder by moving it radially onto said holder until said snap-fit means engages to lock the adapter on the holder.

5. For use in combination with a chuck having a plurality of movable jaws, a chuck jaw assembly adapted to be mounted on a jaw of the chuck, said assembly comprising a holder and at least two selectively replaceable adapters, said holder having a seat thereon for selectively replaceably receiving said adapters, said seat being at least partially defined by a pair of mutually perpendicular locating surfaces, one of said locating surfaces being parallel to the axis of said chuck and the other locating surface being located in a radial plane of said chuck when said holder is mounted upon said chuck, each of said adapters having a pair of mutually perpendicular locating surfaces, one of said surfaces being parallel to the axis of said chuck when said adapter is mounted upon said chuck and the other locating surface being located in a radial plane of said chuck when said adapter is mounted upon said chuck, said mutually perpendicular surfaces of said adapters being cooperable with the mutually perpendicular surfaces of said holder to locate said adapters on said holder, cooperating snap-fit means on said holder and said adapters for replaceably securing said adapters on said holder, and workpiece engaging surfaces on a side of said adapters located opposite said one locating surface of said adapters, said workpiece engaging surface of one of said adapters having hardened inserts mounted therein and the other adapter having an unhardened workpiece engaging surface adapted to be machined while said adapter is mounted on the chuck so as to accommodate varying size workpieces, and screw means for fixedly securing said second adapter on said holder during the machining of said workpiece engaging surface of said second adapter.

6. The chuck jaw assembly of claim 5 wherein said screw means includes a radially extending threaded aperture in said second adapter, a radially extending aperture through said holder and a screw adapted to be inserted through said aperture of said holder into said threaded aperture of said second adapter.

7. For use in combination with a chuck having a plurality of movable jaws, a chuck jaw assembly adapted to be mounted upon a jaw of the chuck, said assembly comprising a holder and an adapter, said holder having a seat thereon for receiving said adapter, said seat being at least partially defined by a pair of mutually perpendicular locating surfaces, one of said surfaces being parallel to the axis of said chuck and the other surface being located in a radial plane of said chuck when said holder is mounted upon said chuck, said adapter having a pair of mutually perpendicular surfaces, one of said surfaces being parallel to the axis of said chuck when said adapter is mounted upon said chuck and the other surface being located in a radial plane of said chuck when said adapter is mounted upon said chuck, said mutually perpendicular surfaces of said adapter being cooperable with the mutually perpendicular surfaces of said holder to locate said adapter on said seat of said holder, cooperating snap-fit means on said holder and said adapter for replaceably securing said adapter on said holder, a ledge on one of said adapter or holder and a cooperating recess on the other of said adapter or holder, said ledge and recess being located in a plane perpendicular to the axis of said chuck when said assembly is mounted upon said chuck and having closely fitting radial surfaces which prevent said adapter from moving axially on said holder, and a key on one of said adapters or holders and a keyway on the other of said adapters or holders, said key and keyway being located in a radial plane of a chuck when said assembly is mounted upon said chuck so that said adapter can only be secured to said holder by moving it radially on said holder until said snap-fit means engages to locate the adapter on the holder.

8. For use in combination with a chuck having a plurality of movable jaws, a chuck jaw assembly adapted to be mounted upon a movable jaw of the chuck, said assembly comprising a holder and an adapter, said holder having a seat thereon for receiving said adapter, said seat being at least partially defined by a pair of mutually perpendicular locating surfaces, one of said surfaces being parallel to the axis of said chuck and the other surface being located in a radial plane of said chuck when said holder is mounted upon said chuck, said adapter having a pair of mutually perpendicular locating surfaces, one locating surface of said adapter being parallel to the axis of said chuck when said adapter is mounted upon said chuck and the other adapter locating surface being located in a radial plane of said chuck when said adapter is mounted upon said chuck, said mutually perpendicular surfaces of said adapter being cooperable with the mutually perpendicular surfaces of said holder to locate said adapter on said seat of said holder, said adapter having a workpiece engaging surface located on a side of said adapter opposite the side on which said one locating surface is located, and cooperating snap-fit means on said holder and said adapter for replaceably securing said adapter on said holder, said snap-fit means comprising a pin on one of said adapter and holder and a pin receiving aperture on the other of said adapter and holder, one of said pin and pin receiving aperture being located on the side of said adapter which is opposite from said workpiece engaging surface side.

9. The chuck jaw assembly of claim 8 wherein said pin is located on said adapter and is engageable in an aperture of said holder.

10. The chuck jaw assembly of claim 8 wherein said pin has a camming surface thereon and said aperture has a detent means therein cooperable with said cam surface of said pin to bias said pin into said aperture and thereby maintain a resilient bias on said one surface of said adapter pulling it into engagement with said one surface of said holder when said adapter is mounted upon said holder.

11. The chuck jaw assembly of claim 10 wherein said cam surface on said pin comprises a ball on the end of said pin and said detent means comprises a pair of opposed detent pins engageable with the side of said ball located adjacent said one surface of said adapter.

12. The chuck jaw assembly of claim 11 which further includes a ledge on one of said adapter or holder and a cooperating recess on the other of said adapter and holder, said ledge and recess being located in a plane perpendicular to the axis of said chuck when said assembly is mounted upon said chuck and having closely fitting cooperating radial surfaces which prevent said adapter from moving axially on said holder.

13. The chuck jaw assembly of claim 12 which further includes a key on one of said adapter or holder and a cooperating keyway on the other of said adapter or holder, said key and keyway being located in a radial plane of a chuck when said assembly is mounted upon said chuck so that said adapter can only be secured to said holder by moving it radially onto said holder until said snap-fit means engages to lock the adapter on the holder.